US011434796B2

(12) United States Patent
Kim

(10) Patent No.: US 11,434,796 B2
(45) Date of Patent: Sep. 6, 2022

(54) EXHAUST FLUID COLLISION TYPE MUFFLER

(71) Applicants:Hyundai Motor Company, Seoul (KR); Kia Motors Corporation, Seoul (KR)

(72) Inventor: Ju-Hyun Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 453 days.

(21) Appl. No.: 16/670,866

(22) Filed: Oct. 31, 2019

(65) Prior Publication Data

US 2020/0318523 A1  Oct. 8, 2020

(30) Foreign Application Priority Data

Apr. 4, 2019 (KR) .................. 10-2019-0039428

(51) Int. Cl.
*F01N 1/02* (2006.01)
*F01N 3/00* (2006.01)
*F01N 1/08* (2006.01)

(52) U.S. Cl.
CPC .............. *F01N 3/005* (2013.01); *F01N 1/02* (2013.01); *F01N 1/082* (2013.01); *F01N 1/085* (2013.01); *F01N 2240/16* (2013.01); *F01N 2470/18* (2013.01); *F01N 2570/22* (2013.01)

(58) Field of Classification Search
CPC .......... F01N 1/081; F01N 1/082; F01N 3/005; F01N 2240/22; F01N 2570/22
See application file for complete search history.

(56) References Cited

U.S. PATENT DOCUMENTS

| 3,266,227 | A | * | 8/1966 | Plizak | B01D 45/06 55/485 |
| 3,421,315 | A | * | 1/1969 | Aoi | F01N 3/038 55/300 |
| 3,860,403 | A | * | 1/1975 | Aoi | F01N 3/038 55/319 |
| 6,024,617 | A | * | 2/2000 | Smullin | F01N 1/02 440/89 R |
| 2004/0132364 | A1 | * | 7/2004 | Wulliman | B32B 27/10 442/40 |

(Continued)

FOREIGN PATENT DOCUMENTS

WO    WO 2006/100990 A    9/2006

*Primary Examiner* — Jonathan R Matthias
(74) *Attorney, Agent, or Firm* — Morgan, Lewis & Bockius LLP

(57) ABSTRACT

A muffler may include a thin plate mesh provided in an internal space of an inlet chamber formed at a side opposite to an outlet chamber of a muffler housing such that gas contained in exhaust fluid passes through the thin plate mesh by collision of the exhaust fluid against the thin plate mesh and water contained in the exhaust fluid is separated from the gas; a water movement guide fluidically-connected to the inlet chamber and the outlet chamber for allowing the water gathered at the front side of the thin plate mesh in the internal space of the inlet chamber to flow therein and move to the outlet chamber; and a muffler pipe connected to the inlet chamber and the outlet chamber for allowing the gas gathered at the rear side of the thin plate mesh in the internal space of the inlet chamber to move to the outlet chamber.

17 Claims, 7 Drawing Sheets

(56) References Cited

U.S. PATENT DOCUMENTS

2008/0185218 A1     8/2008   Kondo
2017/0241317 A1*   8/2017   Bradford .............. F02M 35/082
2018/0171842 A1*   6/2018   Na .......................... F01N 3/005

* cited by examiner

EXHAUST FLUID COLLISION TYPE MUFFLER

CROSS-REFERENCE TO RELATED APPLICATION

The present application claims priority to Korean Patent Application No. 10-2019-0039428, filed on Apr. 4, 2019, the entire contents of which is incorporated herein for all purposes by this reference.

BACKGROUND OF THE INVENTION

Field of the Invention

Exemplary embodiments of the present invention relates to a muffler, and more particularly, to an exhaust fluid collision type muffler for effectively separating water contained in exhaust fluid by forcing the exhaust fluid to collide in an internal space of the muffler immediately when entering the internal space.

Description of Related Art

Generally, exhaust fluid which is generated in hydrogen fuel cell vehicles and fuel cell vehicles and discharged to the atmosphere may include hydrogen, air, water vapor, etc., as well as water, which are generated by hydrogen reaction in a hydrogen fuel cell stack (or a fuel cell stack).

To the present end, a muffler having a function of treating water contained in the exhaust fluid is applied to an exhaust system of such hydrogen fuel cell vehicles.

For example, there has been provided a muffler configured to have a structure for separating water, to which a sound absorbing material wrapping around an internal pipe is applied, or a structure for separating water, to which plates having fine perforations are applied, such that water is separated in an internal space of the muffler while exhaust fluid passes through the internal space of the muffler.

The muffler, therefore, contributes to reduction of noise caused during running of the hydrogen fuel cell vehicles by reducing noise caused because water particles or water molecules in the exhaust fluid collide against a passage wall (or exhaust line and muffler) during running of the hydrogen fuel cell vehicles.

In the muffler of the related art, however, it is demanded to improve performance of the muffler because performance of separating water in the muffler of the related art could not keep up with increase in flow rate of the exhaust fluid, which may be encountered in operational circumstances of a hydrogen fuel cell stack depending on driving conditions of the vehicle.

The reason is that flow velocity of the exhaust fluid to be increased according to the increase in flow rate of the exhaust fluid disables separation of water in the muffler and thus noise to be generated by water molecules colliding against the wall increases.

Furthermore, as performance of hydrogen fuel cell vehicles is rapidly improved, it is further demanded to improve water separation performance of the muffler.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an exhaust fluid collision type muffler designed such that an effect of separating gas and water contained in exhaust fluid is enhanced by forcing the exhaust fluid to collide against a polyester mesh having fine density in an inlet section and at the same time noise which may be generated due to collision of the water against a wall of the muffler is removed by extinction of kinetic energy of the water, which is effected by allowing the water separated from the gas to fall freely by action of gravity, and, by a sound absorbing material using a sponge-like foamed aluminum product, noise reduction effect is further enhanced and an effect of preventing freezing of the water is also exerted.

Other objects and advantages of the present invention may be understood by the following description and become apparent with reference to the exemplary embodiments of the present invention. Also, it is obvious to those skilled in the art to which an exemplary embodiment of the present invention pertains that the objects and advantages of the present invention may be realized by the means as claimed and combinations thereof.

In accordance with one aspect of the present invention for accomplishing the objects as mentioned above, there may be provided a muffler including: a thin plate mesh provided in an internal space of an inlet chamber formed at a side opposite to an outlet chamber of a muffler housing such that gas contained in exhaust fluid passes through the thin plate mesh by collision of the exhaust fluid against the thin plate mesh and water contained in the exhaust fluid is separated from the gas; a water movement guide fluidically-connected to the inlet chamber and the outlet chamber for allowing the water gathered at the front side of the thin plate mesh in the internal space of the inlet chamber to flow therein and move to the outlet chamber; and a muffler pipe connected to the inlet chamber and the outlet chamber for allowing the gas gathered at the rear side of the thin plate mesh in the internal space of the inlet chamber to move to the outlet chamber.

In an exemplary embodiment of the present invention, the muffler may be configured such that the water falls to the bottom surface of the muffler housing by action of gravity.

In an exemplary embodiment of the present invention, the thin plate mesh may be made of polyester wherein density of the polyester may be defined to be smaller than particle size of the water which is reduced in size due to pressure rising of the exhaust fluid. The polyester may form first to Nth polyester thin sheets wherein the first to Nth polyester thin sheets are formed into a mesh layer by being overlapped with each other.

In an exemplary embodiment of the present invention, the water movement guide may be provided on the bottom surface of the muffler housing to allow the water to move from the inlet chamber to the outlet chamber through the water movement guide. The water movement guide may be formed with a movement passage for allowing the water to flow therein from the inlet chamber and then flow to the outlet chamber wherein the movement passage includes air discharge ports for discharging the gas introduced into the movement passage together with the water from the movement passage to an outside of the water movement guide.

In an exemplary embodiment of the present invention, the air discharge ports may fluidically-communicate with the movement passage and the gas discharged from the air discharge ports may enter an intermediate chamber connecting the inlet chamber and the outlet chamber.

In an exemplary embodiment of the present invention, the intermediate chamber may be divided into a sound absorbing material chamber disposed adjacent to the inlet chamber and a damping chamber disposed adjacent to the sound absorbing material chamber toward the outlet chamber wherein the sound absorbing material chamber may be configured to allow the gas discharged from the air discharge ports to flow therein. The sound absorbing material chamber may be provided with a sound absorbing material wherein the sound absorbing material is configured to absorb sound energy of the gas discharged from the air discharge ports.

In an exemplary embodiment of the present invention, the sound absorbing material may be made of a foamed aluminum product and the foamed aluminum product may be made of first to Nth foamed aluminum plates wherein the foamed aluminum plates are overlapped in spaced relation to each other so that plate layers are formed and air layers are formed between the plate layers.

In an exemplary embodiment of the present invention, the intermediate chamber may be provided with a muffler pipe connecting the inlet chamber and the outlet chamber.

In an exemplary embodiment of the present invention, the inlet chamber may be provided with an inlet port through which the exhaust fluid flows and the outlet chamber may be provided with an outlet port through which the water and the gas exit to the outside of the muffler housing. The inlet port and the outlet port may be mounted at right angles to each other in the muffler housing and the outlet port may fluidically-communicate with the bottom surface of the muffler housing.

In an exemplary embodiment of the present invention, the water movement guide may be provided with a heater to prevent freezing of the water by generation of heat. The heater generates heat by operation of a switch wherein the switch may include an on/off type button switch.

It is to be understood that both the foregoing general description and the following detailed description of the present invention are exemplary and explanatory and are intended to provide further explanation of the disclosure as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
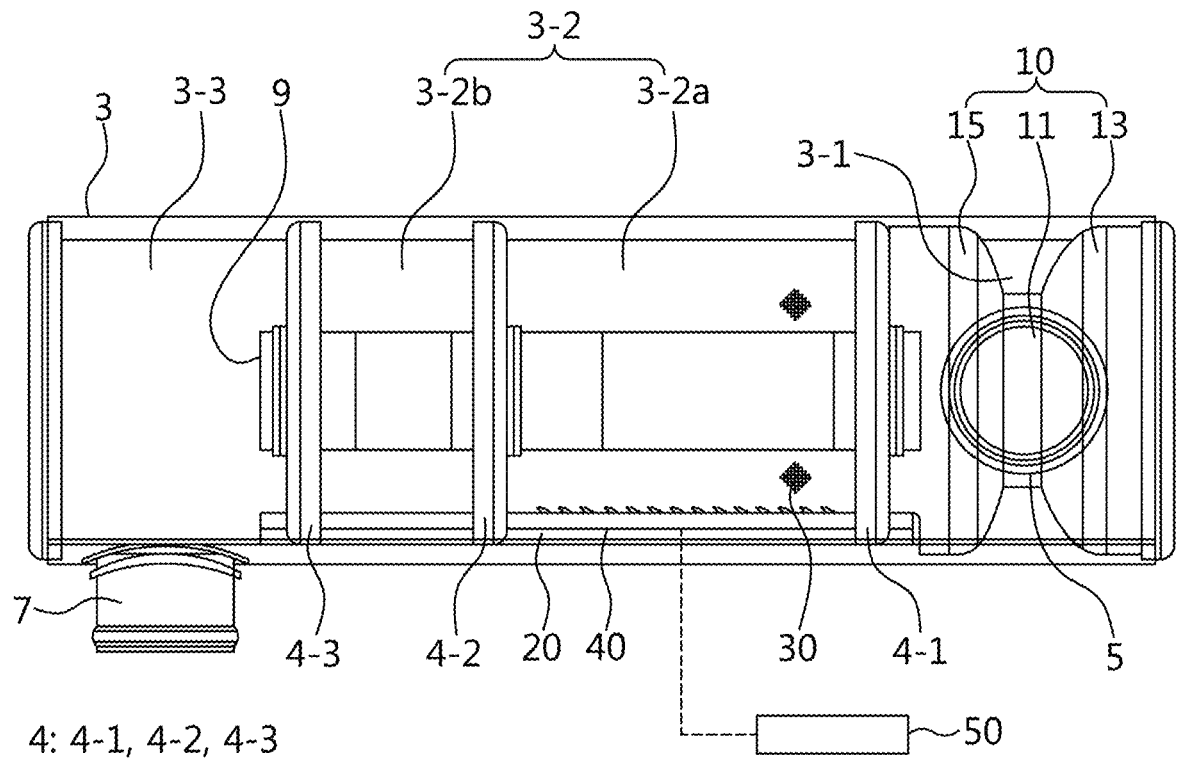
FIG. 1 is a front view exemplarily illustrating configuration of an exhaust fluid collision type muffler according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention will be described below in detail with reference to the accompanying drawings. Since these embodiments described herein by way of example may be implemented in various forms by those of ordinary skill in the field of art to which an exemplary embodiment of the present invention pertains, the present invention is not limited thereto.

Figure 2:
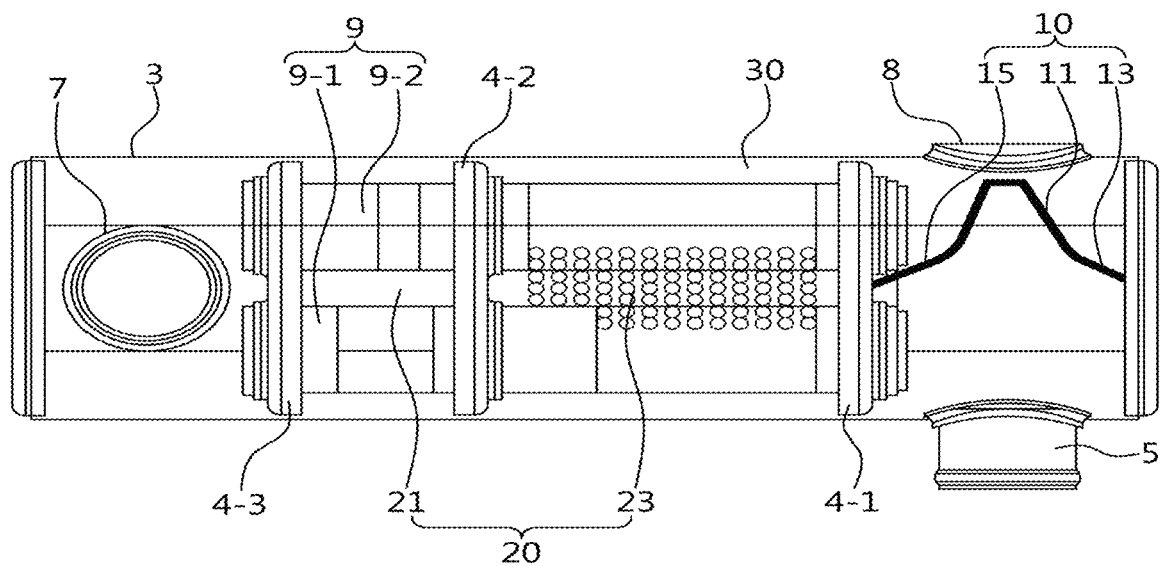
FIG. 2 is a side view exemplarily illustrating configuration of an exhaust fluid collision type muffler according to an exemplary embodiment of the present invention.

Referring to FIG. 1 and FIG. 2 which are front and side views of a muffler respectively, a muffler includes a muffler housing 3, partition walls 4, an inlet port 5, an outlet port 7, muffler pipes 9, a thin plate mesh 10, a water movement guide 20, a sound absorbing material 30 and a heater 40.

The thin plate mesh 10 is configured to allow exhaust fluid discharged from a hydrogen fuel cell stack, in which water and gas and noise are mixed with each other, to collide against it in an inlet section formed by the inlet port 5 of the muffler such that it exerts a considerable effect of separating water and at the same time prevents or greatly reduces noise which may be generated by collision of water against a wall. Therefore, the muffler may be characterized as an exhaust fluid collision type muffler.

The thin plate mesh 10 is formed in a bow-tie shape (see FIG. 1) in a longitudinal direction of the muffler housing 3 to spread toward right and left sides respectively in an internal space formed by an inlet chamber 3-1 of the muffler housing 3 while it is formed in a funnel shape (see FIG. 2)

in a width direction of the muffler housing 3 to be arranged vertically in the internal space of the inlet chamber 3-1. With the present configuration, the thin plate mesh 10 allows the exhaust fluid entering from the inlet chamber 3-1 to collide against it so that energy (i.e., kinetic and sound energy) of the exhaust fluid is lost and it is separated into water and gas.

To the present end, the thin plate mesh 10 includes a separating body 11, a left portion 13 and a right portion 15. The separating body 11 protrudes to form a central section of the thin plate mesh 10 while the left portion 13 is spread widely at the left portion of the separating body 11 and the right portion 15 is spread widely at the right portion of the separating body 11. Therefore, the separating body 11 protrudes at the center portion so that the thin plate mesh 10 is formed into the funnel shape (see FIG. 2) while the left portion 13 and the right portion 15 are spread toward the left and right sides respectively so that the thin plate mesh 10 is formed into the bow-tie shape (see FIG. 1).

The thin plate mesh 10 is provided in the internal space of the inlet chamber 3-1 by fixing the left portion 13 by a first partition wall 4-1 of the partition walls 4 and fixing the right portion 15 by an external wall of the muffler housing 3 (in other words, an internal wall of the inlet chamber 3-1). In the instant case, fixing of the left and right portions 13 and 15 may be made by screw fastening or fitting connection using a hook or a hole.

The water movement guide 20 includes a guide body 21 mounted on the bottom surface of the muffler housing 3. The guide body 21 is configured such that a body portion thereof passes through a sound absorbing material chamber 3-2a and a damping chamber 3-2b of the muffler housing 3, an inlet portion thereof is located in the inlet chamber 3-1 to allow water and some gas to flow therein from the inlet chamber 3-1 and an outlet portion thereof is located in the outlet chamber 3-2 to allow water from which some gas is separated to exit to the outlet chamber 3-2.

In the instant case, the some gas refers to gas that cannot enter the muffler pipe 9 from the inlet chamber 3-1 but flows into the water movement guide 20 together with water. The reason why such some gas is generated is that because of the structure of the muffler 1, a portion of gas moves together with water when the water (liquid) in the muffler falls downward of the muffler by gravity.

The guide body 21 is provided with air discharge ports 23 and a movement passage 25. Each of the air discharge ports 23 is formed in a protrusion shape protruding from the surface of the body portion. The air discharge ports 23 are configured to fluidically-communicate with the movement passage 25 such that some gas that has entered the movement passage 25 together with water exits to the sound absorbing material chamber 3-2a and the damping chamber 3-2b and in turn sound energy is absorbed by the sound absorbing material 30. The movement passage 25 penetrates the body portion such that the inlet portion and the outlet portion of the body portion are connected. As a result, water may be discharged from the inlet chamber 3-1 to the outlet chamber 3-2 of the muffler housing 3.

The sound absorbing material 30 is filled in the sound absorbing material chamber 3-2a of the muffler housing 3 to surround the muffler pipes 9 such that noise energy of gas passing through the muffler pipes 9 and some gas discharged from the air discharge ports 23 of the guide body 21 is absorbed.

The heater 40 is provided in the guide body 21 of the water movement guide 20 and forms an electric circuit to a battery via a switch 50. Therefore, the heater 40 is supplied with electric power for generating heat from the battery and heats the water movement guide 20, preventing freezing of water flowing through the movement passage 25 of the guide body 21.

The switch 50 is provided in a driver's compartment such that electric power for generating heat is supplied from the battery by on/off button operation of the driver. To the present end, the switch 50 may be a button switch, or a temperature sensor switch which is automatically turned on/off at a temperature below a freezing temperature to supply electric power for generating heat from the battery.

The muffler housing 3, the partition walls 4, the inlet port 5, the outlet port 7 and the muffler pipes 9 are typical components of the muffler 1.

For example, an internal space of the muffler housing 3 includes the inlet chamber 3-1, the intermediate chamber 3-2 and the outlet chamber 3-3 by the partition walls 4. In the instant case, the inlet chamber 3-1 forms a built-in space for the thin plate mesh 10 while it is formed to fluidically-communicate with the inlet port 5 so that exhaust fluid from the inlet port 5 collides against the thin plate mesh 10.

Furthermore, the intermediate chamber 3-2 is extended from the inlet chamber 3-1 and divided into the sound absorbing material chamber 3-2a and the damping chamber 3-2b. This intermediate chamber includes the water movement guide 20 for discharging water and the muffler pipes 9 for discharging gas. A space of the sound absorbing material chamber 3-2a is filled with the sound absorbing material 30, reducing exhaust noise. The outlet chamber 3-3 forms an internal space in which the gas moved through the muffler pipes 9 and the water moved through the water movement guide 20 are gathered.

Furthermore, the inlet chamber 3-1 is formed with a position protrusion 3a (see FIG. 2) protruding into the internal space thereof. The position protrusion 3a is positioned on a separating body 11 side (see FIG. 2) of the thin plate mesh 10 at a position opposite to the inlet port 5 so that it is formed at the position opposite to the inlet port 5, stably supporting deformation of the separating body 11 due to increase of kinetic energy of the exhaust fluid.

For example, the partition walls 4 include first, second, and third partition walls 4-1, 4-2 and 4-3. The first partition wall 4-1 partitions between the inlet chamber 3-1 and the sound absorbing material chamber 3-2a. The second partition wall 4-2 partitions between the sound absorbing material chamber 3-2a and the damping chamber 3-2b. The third partition wall 4-3 partitions between the damping chamber 3-2b and the outlet chamber 3-3.

Each of the second and third partition walls 4-2 and 4-3 out of the first to third partition walls 4-1, 4-2 and 4-3 are formed with predetermined through holes so that movement passages for the gas are formed. Therefore, some gas discharged from the air discharge ports 23 of the water movement guide 20 may be moved out from the sound absorbing material chamber 3-2a and the damping chamber 3-2b to the outlet chamber 3-3. Furthermore, a groove or slit through which the guide body 21 of the water movement guide 20 passes is formed in each of the first, second, and third partition walls 4-1, 4-2 and 4-3 to stably fix the guide body 21.

For example, the inlet port 5 is connected to an exhaust line of an exhaust system to allow exhaust fluid to move to the inlet chamber 3-1 of the muffler housing 3 and the outlet port 7 is configured to fluidically-communicate with the outlet chamber 3-3 to discharge the water and the gas to the outside of the muffler housing 3.

Therefore, the inlet port 5 is provided at a position spaced from the bottom surface of the muffler housing 3 so that water separated from the exhaust fluid falls by gravity. Furthermore, the outlet port 7 is provided on the bottom surface of the muffler housing 3 to easily discharge water flowing to the bottom surface. In the exemplary embodiment of the present invention, the inlet port 5 and the outlet port 7 form a layout in which they are arranged at right angles to each other with respect to the muffler housing 3.

For example, the muffler pipes 9 are supported by the first, second, and third partition walls 4-1, 4-2, 4-3 while a pipe body thereof is allowed to pass through the sound absorbing material chamber 3-2*a* and the damping chamber 3-2*b* such that the gas moves through the muffler pipe. In the instant case, the inlet portion of the muffler pipe is mounted in the inlet chamber 3-1 to allow the gas to flow therein from the inlet chamber 3-1 and the outlet portion is mounted in the outlet chamber 3-2 to discharge the gas to the outlet chamber 3-2.

The muffler pipes 9 include a first muffler pipe 9-1 and a second muffler pipe 9-2 which are stacked in a width direction of the muffler housing 3. Therefore, the first muffler pipe 9-1 acts as a passage allowing some gas that has not passed through the thin plate mesh 10 to be introduced therein from the front space of the thin plate mesh 10, while the second muffler pipe 9-2 acts as a passage allowing the gas that has passed through the thin plate mesh 10 to be introduced therein from the rear space of the thin plate mesh 10.

Figure 3:
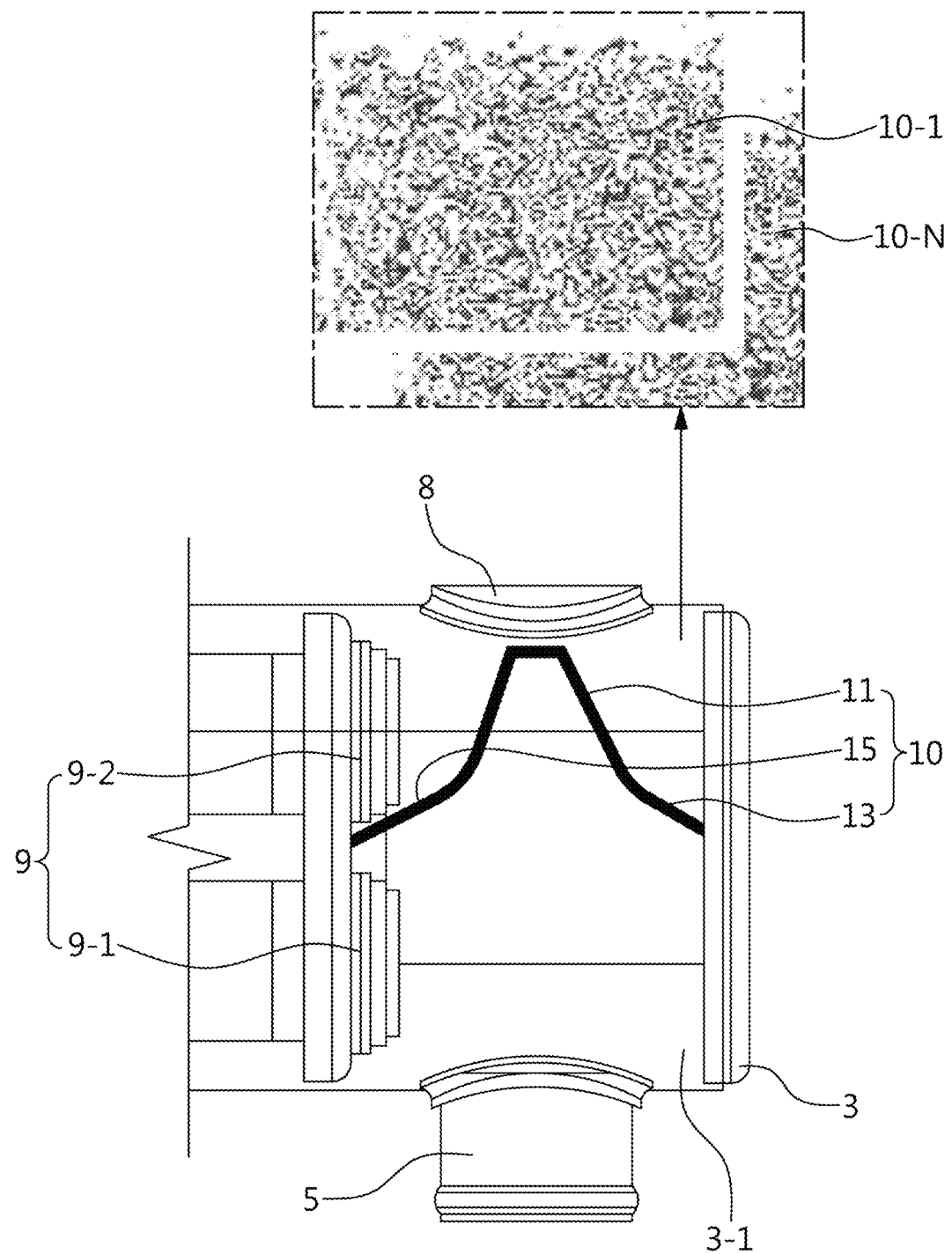
FIG. 3 is a detailed schematic diagram of a thin plate mesh for separating water and gas by allowing exhaust fluid to collide against the thin plate mesh in an internal space of a muffler according to an exemplary embodiment of the present invention.
Figure 4:
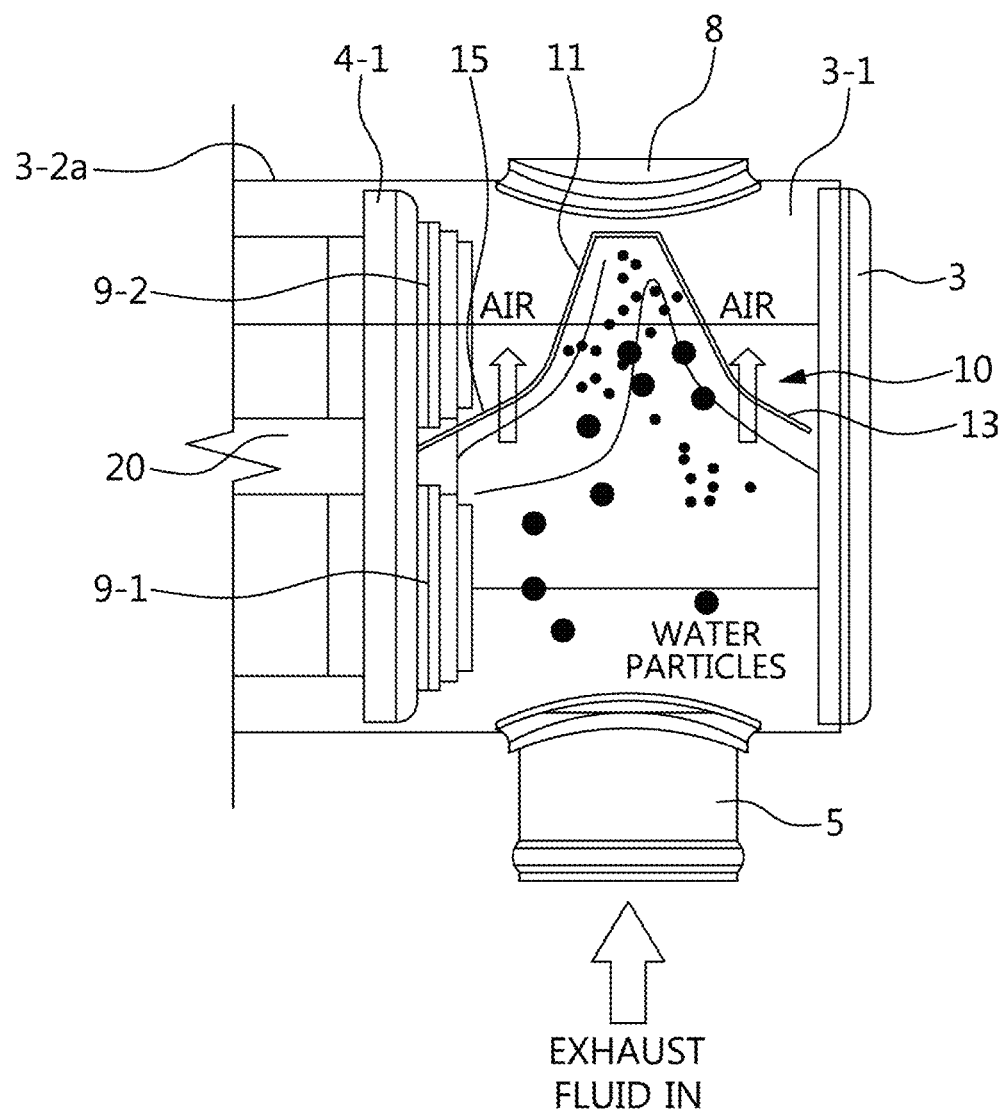
FIG. 4 is a diagram for showing an operating state of a thin plate mesh according to an exemplary embodiment of the present invention.

FIG. 3 and FIG. 4 show detailed configuration and an operating state of the thin plate mesh 10 respectively.

Referring to FIG. 3, the thin plate mesh 10 includes a polyester thin sheet as a component wherein the polyester thin sheet is made of polyester and wires to maintain its shape because the polyester is of a fiber material. In the instant case, the polyester thin sheet using composite of the polyester and wires is of a conventional structure.

On the other hand, the thin plate mesh 10 is configured such that particle density of the polyester thin sheet is set depending on pressure of the exhaust fluid. This is because particle size of the water contained in the exhaust fluid depends on pressure of the exhaust fluid.

For example, it is found that when pressure of the exhaust fluid is 3 bar, particle size of the water is 109 μm; when pressure of the exhaust fluid is 5 bar, particle size of the water is 94 μm; when pressure of the exhaust fluid is 7 bar, particle size of the water is 75 μm; and when pressure of the exhaust fluid is 9 bar, particle size of the water is 69 μm. As described above, as the pressure of the exhaust fluid increases, the particle size of the water decreases. In the exemplary embodiment of the present invention, considering the present relationship, the thin plate mesh 10 is configured such that density of the polyester thin sheet is set as 60 μm according to the assumption that particle size of the water is 69 μm.

Therefore, the thin plate mesh 10 is manufactured into a thin plate configuration by forming a plurality of polyester thin sheets having a density of 60 μm respectively and having the same shape and structure, then separating the plurality of polyester thin sheets into first to Nth thin polyester sheets 10-1, . . . , 10-N(N is an integer of 2 or more) and overlapping them with each other, preparing a mesh layer in which the first to Nth thin polyester sheets 10-1, . . . , 10-N are overlapped with each other, and then forming the separating body 11, the left portion 13 and the right portion 15 in the mesh layer.

The thin plate mesh 10 is formed by overlapping the first to Nth thin polyester sheets 10-1, . . . , 10-N so that it is very effective in the action of allowing air to pass through it but not allowing water molecules to pass through it.

For example, the thin plate mesh configuration of the thin plate mesh 10 is formed by forming the separating body 11 to be protruded on the mesh layer and bending the left side portion of the separating body 11 toward the outside of the left side of the separating body 11 to form the left side end portion 13 while bending the right side portion of the separating body toward the outside of the right side of the separating body 11.

Ultimately, the thin plate mesh 10 is formed such that the left and right portions 13 and 15 form a bow-tie shape (see FIG. 1) with respect to the separating body 11 and at the same time the separating body 11 forms a funnel shape (see FIG. 2) with respect to the left and right portions 13 and 15.

Referring to FIG. 4 which is a rear view of the muffler, the present figure illustrates action of thin plate mesh 10 that the exhaust fluid which is a mixture of water (liquid) and gas (oxygen, nitrogen, hydrogen, etc.) and introduced through the inlet chamber 5 is forced to collide against the thin plate mesh and in turn separated into the water (liquid) and the gas (oxygen, nitrogen, hydrogen, etc.) in the internal space of the inlet chamber 3-1.

As shown, the thin plate mesh 10 allows the exhaust fluid to be gathered toward the separating body 11 and to collide against it by its funnel shape. As a result, kinetic energy of the exhaust fluid is mitigated and water particles of 69 to 109 μm are separated from the gas by the polyester thin sheet having a density of 60 μm. The funnel shape of the thin plate mesh 10 allows the exhaust fluid to concentrate into the space of the separating body 11.

As such, almost all of the gas contained in the exhaust fluid except for some gas which could not pass through the thin plate mesh 10 due to the structure of the muffler and thus stays in the front space of the thin plate mesh 10 within the inlet chamber 3-1 passes through the separation body 11 and the left and right portions 13 and 15 and exits to the rear space of the thin plate mesh 10 within the inlet chamber 3-1. This is because particle size of the gas such as air is relatively small and particle size of the water is relatively large in comparison with the density of 60 μm of the thin plate mesh.

Subsequently, some gas gathered in a gas collector 8 in the front space of the thin plate mesh 10 is forced to move to the first muffler pipe 9-1 and exit the inlet chamber 3-1 and move to the outlet chamber 3-3, while the gas gathered in the rear space of the thin plate mesh 10 is forced to move to the second muffler pipe 9-2 and exit the inlet chamber 3-1 and flow out to the outlet chamber 3-3.

On the other hand, the water gathered in the front space of the thin plate mesh 10 moves down to the bottom surface of the inlet chamber 3-1 by action of gravity and moves through the movement passage 25 formed in the guide body 21 of the water movement guide 20. At the instant time, some gas staying in the front space of the thin plate mesh (10) but not yet moved to the first muffler pipe 9-1 also moves to the movement passage 25 together with the water.

As described above, the thin plate mesh 10 performs in the inlet chamber 3-1 of the muffler housing 3 the action for completely separating the water and the gas contained in the exhaust fluid which is a mixture of the water and the gas before the exhaust fluid moves to the first and second muffler pipes 9-1 and 9-2. As the thin plate mesh 10 absorbs kinetic energy of the water such that water particles (or water molecules) lose kinetic energy, the water gathered in the outlet chamber 3-3 through the water movement guide 20 may be discharged through the outlet port 7 without being scattered.

Figure 5:
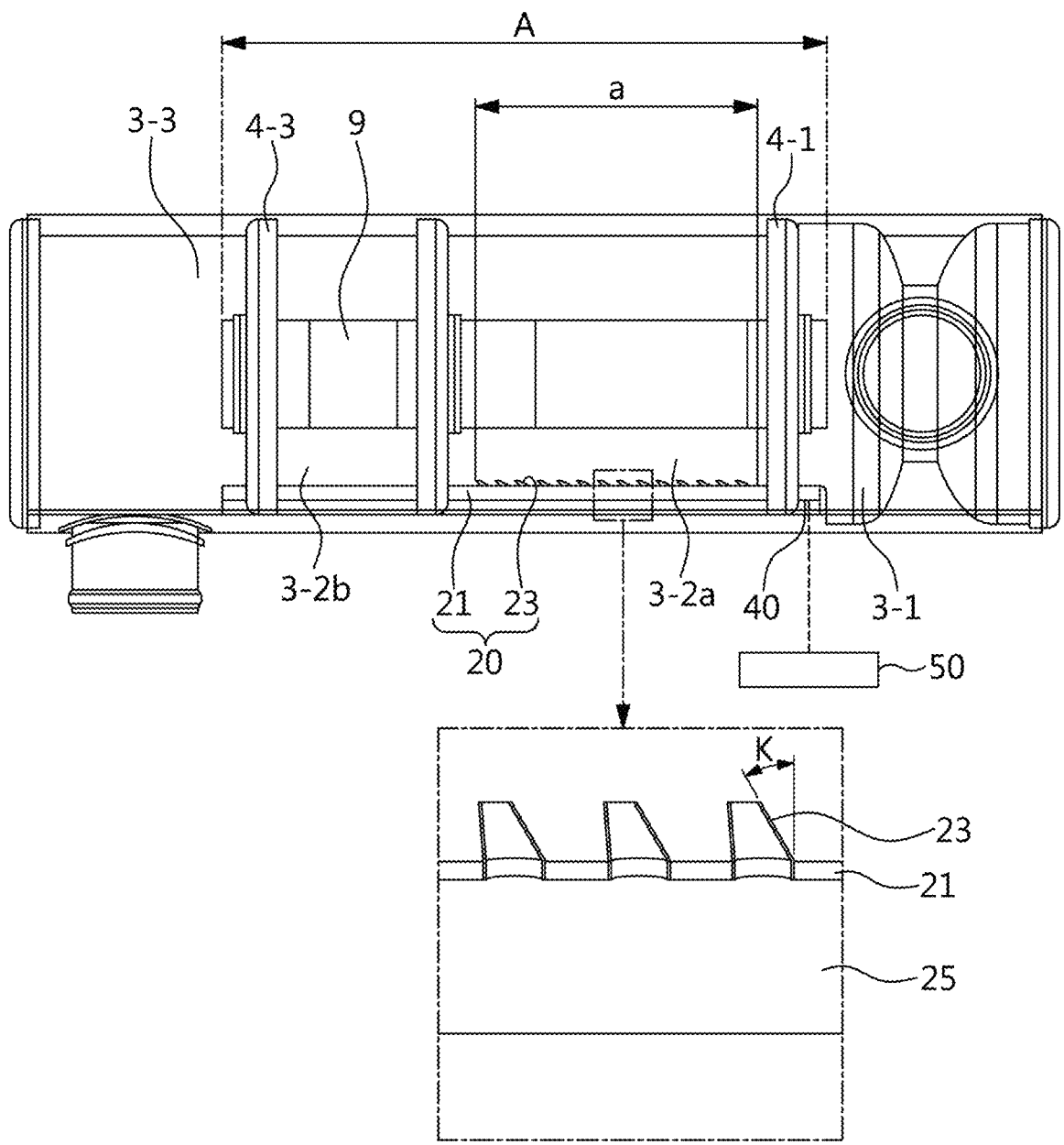
FIG. 5 is a detailed schematic diagram illustrating a water movement guide fluidically-connected to the inlet chamber and the outlet chamber for discharging water separated from exhaust fluid in an internal space of a muffler to the outside of the muffler according to an exemplary embodiment of the present invention.
Figure 6:
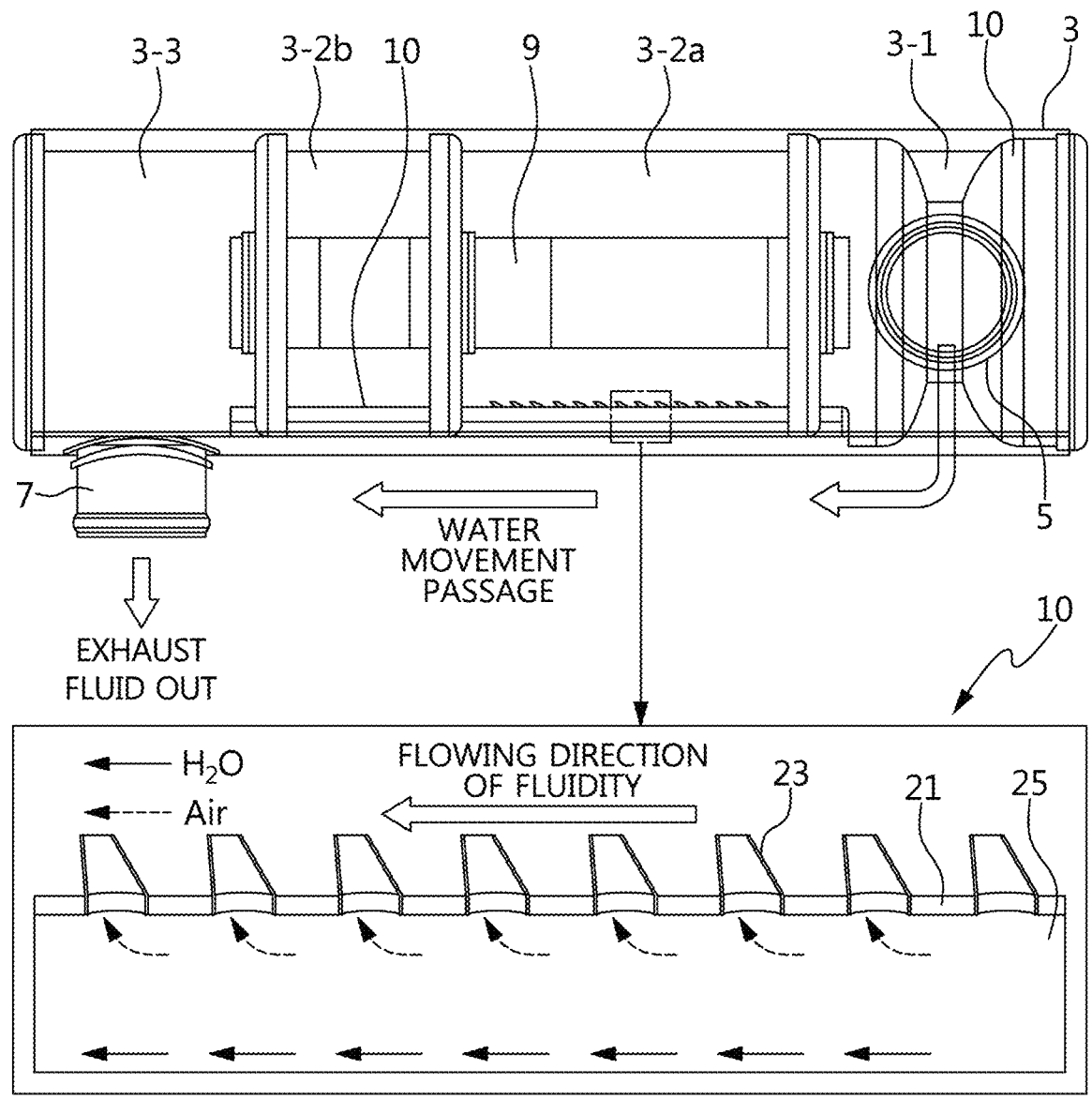
FIG. 6 is a diagram for showing an operating state of a water movement guide according to an exemplary embodiment of the present invention.

Next, FIG. 5 and FIG. 6 show layout and operation of the water movement guide 20 respectively.

Referring to FIG. 5, the present figure illustrates layout of the air discharge ports 23 provided in the guide body 21 of the water movement guide 20. The water movement guide 20 is preferably made of a material having durability against temperature raised by heat generated by the heater 40, although the temperature raised by the heater 40 is limited to such a temperature that freezing of water is prevented.

As shown in the figure, when length A of the water movement passage is taken as a total length of the guide body 21 (i.e., length from the inlet to the outlet), air discharging length a of the air discharge ports 23 may be set to be about ⅗ of the total length. However, the air discharging length a may be defined to be equal to a chamber length of the sound absorbing material chamber 3-2a, considering that the gas moved into the water movement guide 20 is discharged to the sound absorbing material chamber 3-2a and thus its sound energy is absorbed through the sound absorbing material 30.

The air discharge ports 23 are composed of a plurality of elements mounted at a regular interval on the surface of the guide body 21 wherein each of the elements is formed to be inclined at a standing angle K of an acute angle toward a flowing direction of the water moving to the outlet chamber 3-3 and as a result all the elements are formed in a structure of inclined teeth array. In the instant case, a section in which the plurality of elements are arrayed may be formed by enlarging width of the guide body 21 in the air discharging length a of the air discharge ports 23 as shown in FIG. 2. To the present end, the width of the guide body 21 may also be enlarged to be equal to the width of the section in which the elements are arrayed such that flow rate of the water in the movement passage 25 may be further increased.

For example, the structure of inclined teeth array may be formed such that an inflow direction into each of the elements is opposite to the flowing direction of the water so that it acts as a backflow preventing structure that prevents the water from entering the inlet chamber 3-1 unexpectedly. However, the air discharge ports 23 may be formed as array of holes formed by piercing through the surface of the guide body 21, only focusing on the function of discharging gas.

Referring to FIG. 6, the present figure illustrates action of the air discharge ports 23 and the movement passage 25 provided in the guide body 21 of the water movement guide 20. As shown, water and some gas enter the inlet portion of the guide body 21 from the inlet chamber 3-1 and move along the movement passage 25. In the present flow of the water and some gas, the water flows along the bottom surface of the movement passage 25 whereas the gas flows along the upper surface of the movement passage 25 in a state separated from the water.

Therefore, some gas exits the movement passage 25 through the elements of the air discharge ports 23, which form the structure of inclined teeth array, and flows out to the sound absorbing material chamber 3-2a whereas the water continues to flow along the movement passage 25 and flows out to the outlet chamber 3-3.

In the present way, the water movement guide 20 is configured to discharge some gas to the sound absorbing material chamber 3-2a and contribute to reducing noise of the muffler 1, which is exerted by sound energy absorbing effect of the sound absorbing material 30 (see FIG. 8) and also is configured to discharge the water to the outlet chamber (3-3) in a stable manner.

As described above, the water movement guide 20 is configured as a passage for allowing the water in the exhaust fluid collided against the thin plate mesh 10 provided in the internal space of the inlet chamber 3-1, which could not pass through the thin plate mesh unlike the gas and gathered in the front space of the thin plate mesh 10 within the internal space of the inlet chamber 3-1, to move to the outlet chamber 3-3. Furthermore, the gas separated from the exhaust fluid and passed through the thin plate mesh 10 after the exhaust fluid collides against the thin plate mesh 10 is gathered in the rear space of the thin plate mesh 10 within the internal space of the inlet chamber 3-1 and moved to the outlet chamber 3-3 through the muffler pipe 9.

Figure 7:
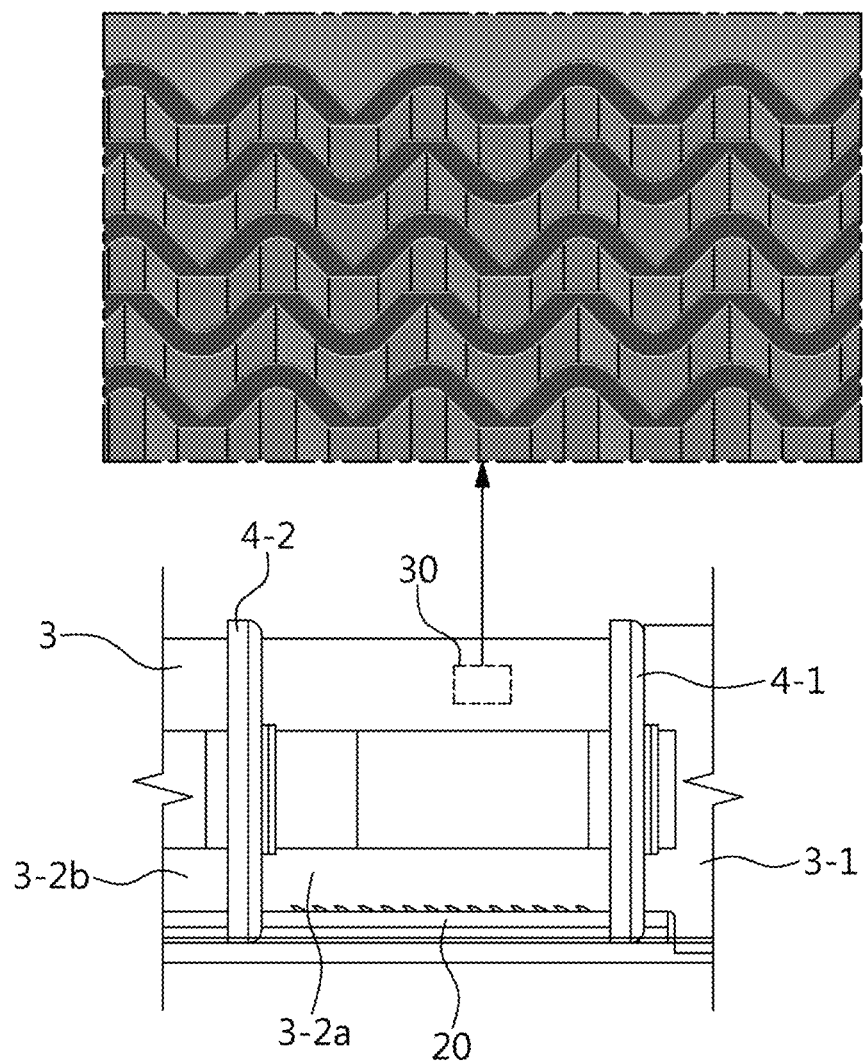
FIG. 7 is a detailed schematic diagram illustrating a sound absorbing material for absorbing sound caused by pressure differential of gas separated from exhaust fluid in an internal space of a muffler according to an exemplary embodiment of the present invention.
Figure 8:
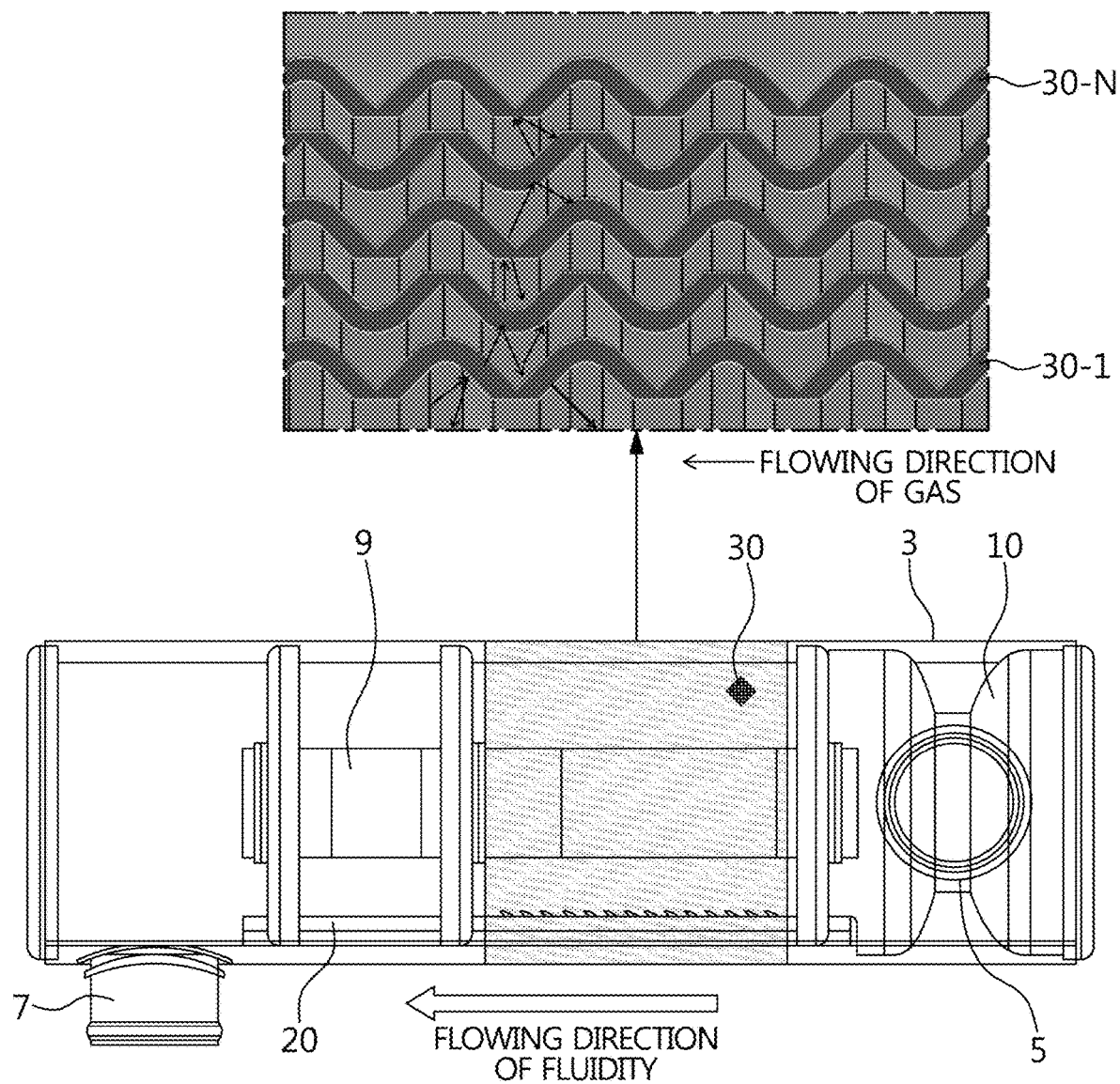
FIG. 8 is a diagram for showing an operating state of a sound absorbing material according to an exemplary embodiment of the present invention.

Next, FIG. 7 and FIG. 8 illustrate detailed configuration and operation of the sound absorbing material 30 respectively.

Referring to FIG. 7, the sound absorbing material 30 is made of a foamed aluminum product. The foamed aluminum product is a metallic product produced by foaming aluminum in a form of a sponge to allow gas or liquid to pass therethrough. Therefore, it is suitable as a sound absorbing material for a fuel cell stack. Furthermore, it may be shaped into a desired shape because it has a constant tensile strength. Furthermore, it may be formed to have irregular surfaces whereby energy may be reflected irregularly.

Therefore, to produce the sound absorbing material 30, the foamed aluminum product is first manufactured into a plurality of foamed aluminum plates in a sponge-like structure having wave forms for applying the maximum cross-sectional area, using its own formability. As such, the plurality of foamed aluminum plates are separated into first to Nth foamed aluminum plates 30-1, . . . , 30-N(N is an integer of 2 or more) and overlapped with each other while keeping a distance spaced from each other so that the first to Nth foamed aluminum plates 30-1, . . . , 30-N form multiple plate layers and multiple air layers. Finally, the sound absorbing material is produced.

The sound absorbing material 30 is inserted into the sound absorbing material chamber 3-2a by a press-fitting method because the first to Nth foamed aluminum plates 30-1, . . . , 30-N are made of a metallic foamed aluminum product.

Referring to FIG. 8, the sound absorbing material 30 absorbs sound energy of the gas (and kinetic energy of the gas) through plate layers and air layers which are formed by each of the first to Nth foamed aluminum plates 30-1, . . . , 30-N. Here, the sound energy is generated by the gas passing through the first and second muffler pipes 9-1 and 9-2 as well as some gas discharged from the air discharge ports 23 of the water movement guide 20 and introduced into the sound absorbing material chamber 3-2a.

Therefore, the sound absorbing material 30 functions such that the sound energy is reflected irregularly by the irregular surfaces of the plate layers and the sound energy reflected irregularly is further reduced through the air layers. Such irregular reflection of the sound energy by the plate layers and absorption of the sound energy by the air layers are continued while the sound energy passes through the plate layers and the air layers formed by each of the first to Nth foamed aluminum plates 30-1, . . . , 30-N so that very effective extinction of the sound energy is accomplished.

As described above, the muffler according to exemplary embodiments of the present invention includes the thin plate mesh 10 composed of the polyester mesh having a density of 60 μm such that the inlet chamber 3-1 in which exhaust fluid is introduced and which is disposed at a side opposite to the outlet chamber 3-1 through which the exhaust fluid is discharged from the internal space of the muffler housing 3 includes a front space in which the exhaust fluid collides against the thin plate mesh and a rear space in which no collision of the exhaust fluid occurs to allow water separated from gas in the exhaust fluid by collision of the exhaust fluid against the thin plate mesh to be gathered in the front space and to be moved to the outlet chamber 3-1 and to allow the gas to be gathered in the rear space and to be moved to the outlet chamber 3-1. According to the inventive muffler, effective separation of gas and water contained in the exhaust fluid is exerted by collision of the exhaust fluid against the thin plate mesh, noise which may be caused by collision of the water against a wall of the muffler is removed because kinetic energy of the water separated from the gas is lost due to free fall of the water by action of gravity, and an effect of reducing noise is exerted by the sound absorbing material 30 using a sponge-like foamed aluminum product and an effect of preventing freezing of the water is also exerted by the heating wire 40.

The inventive muffler makes it possible to separate gas and water by forcing the exhaust fluid to collide against the thin plate mesh so that it realizes the following actions and effects:

First, collision of the exhaust fluid occurs in the inlet section so that water and gas are separated from the exhaust fluid rapidly and effectively. Second, the exhaust fluid is forced to collide against the polyester mesh in the inlet section of the muffler so that an effect of separating the water is increased and at the same time an effect of removing noise is greatly improved by elimination of the cause of noise which may occur due to collision of the water against the wall of the muffler. Third, it is possible to extinguish kinetic energy of the exhaust fluid through collision of the exhaust fluid even upon increase of flow velocity and flow rate of the exhausted fluid, which is often encountered in operational circumstances of a hydrogen fuel cell stack depending on driving conditions of the vehicle, so that effective separation of the water is possible and at the same time the water may be discharged to the outside without scatter of the water. Fourth, the sponge-like foamed aluminum product is provided inside the muffler, which acts as a sound absorbing material and thus further enhances an effect of reducing noise. Fifth, the heating wire is provided in the water discharge passage inside the muffler so that freezing of the water at a temperature below a freezing point is prevented and thus performance of the muffler may be maintained in a stable manner.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A muffler apparatus comprising:
   a muffler housing including an inlet chamber and an outlet chamber formed at a side opposite to the inlet chamber;
   a plate mesh provided in an internal space of the inlet chamber, wherein gas contained in exhaust fluid passes through the plate mesh by collision of the exhaust fluid against the plate mesh and water contained in the exhaust fluid is separated from the gas by the mesh plate;
   a water movement guide fluidically-connected to the inlet chamber and the outlet chamber for allowing the water gathered at a front side of the plate mesh in the internal space of the inlet chamber to flow therein and flow toward the outlet chamber; and
   a muffler pipe connected to the inlet chamber and the outlet chamber for allowing the gas gathered at a rear side of the plate mesh in the internal space of the inlet chamber to flow toward the outlet chamber,
   wherein the water movement guide includes a movement passage for allowing the water to flow therein from the inlet chamber and then flow to the outlet chamber,
   wherein the movement passage includes air discharge ports for discharging the gas introduced into the movement passage with the water from the movement passage to an outside of the water movement guide,
   wherein the muffler housing includes an intermediate chamber disposed between the inlet chamber and the outlet chamber,
   wherein the gas discharged from the air discharge ports enters the intermediate chamber,
   wherein the intermediate chamber includes a sound absorbing material chamber disposed adjacent to the inlet chamber and a damping chamber disposed adjacent to the sound absorbing material chamber toward the outlet chamber, and
   wherein the sound absorbing material chamber is configured to allow the gas discharged from the air discharge ports to flow therein.

2. The muffler apparatus according to claim 1, wherein in the muffler housing, the water is configured to fall to a bottom surface of the muffler housing by action of gravity.

3. The muffler apparatus according to claim 1, wherein the plate mesh is made of polyester.

4. The muffler apparatus according to claim 3, wherein density of the polyester is defined to be smaller than particle size of the water which is reduced in size due to pressure rising of the exhaust fluid.

5. The muffler apparatus according to claim 3, wherein the polyester forms polyester sheets made of first to Nth polyester sheets, wherein the N is an integer of 2 or more.

6. The muffler apparatus according to claim 5, wherein the first to Nth polyester sheets are formed into a mesh layer by being overlapped with each other.

7. The muffler apparatus according to claim 1, wherein the water movement guide is provided on a bottom surface of the muffler housing to allow the water to move from the inlet chamber to the outlet chamber through the water movement guide.

8. The muffler apparatus according to claim 1, wherein the air discharge ports are configured to fluidically-communicate with the movement passage.

9. The muffler apparatus according to claim 1,
wherein the sound absorbing material chamber is provided with a sound absorbing material, and
wherein the sound absorbing material is configured to absorb sound energy of the gas discharged from the air discharge ports.

10. The muffler apparatus according to claim 9,
wherein the sound absorbing material is made of a foamed aluminum product, and
wherein the foamed aluminum product is made of first to Nth foamed aluminum plates, the N being an integer of 2 or more.

11. The muffler apparatus according to claim 10, wherein the first to Nth foamed aluminum plates are overlapped with each other so that plate layers are formed and air layers are formed between the plate layers.

12. The muffler apparatus according to claim 1, wherein the intermediate chamber is provided with the muffler pipe.

13. The muffler apparatus according to claim 1,
wherein the inlet chamber includes an inlet port through which the exhaust fluid flows, and
wherein the outlet chamber includes an outlet port through which the water and the gas exit to an outside of the muffler housing.

14. The muffler apparatus according to claim 13,
wherein the inlet port and the outlet port are disposed at right angles to each other in the muffler housing, and
wherein the outlet port fluidically-communicates with a bottom surface of the muffler housing.

15. The muffler apparatus according to claim 7, wherein the water movement guide is provided with a heater to prevent freezing of the water by generation of heat.

16. The muffler apparatus according to claim 15,
wherein the heater generates heat by operation of a switch, and
wherein the switch is an on/off type button switch.

17. The muffler apparatus according to claim 1,
wherein the muffler housing includes a gas collector to collect the gas at the rear side of the plate mesh, and
wherein the plate mesh includes a separating body, a left portion and a right portion, and the separating body is formed to protrude from the left portion and the right portion toward the gas collector to form a central section of the plate mesh.

* * * * *